United States Patent [19]

Copeland

[11] Patent Number: 4,997,408
[45] Date of Patent: Mar. 5, 1991

[54] AXIAL SPLINE DRIVE LUG

[75] Inventor: Kevin A. Copeland, Greenwood, Ind.

[73] Assignee: General Motors Corporation, Detroit, Mich.

[21] Appl. No.: 434,207

[22] Filed: Nov. 13, 1989

[51] Int. Cl.$^5$ .................... F16D 3/00; F16D 33/00
[52] U.S. Cl. .................... 464/98; 60/330; 464/109; 464/157
[58] Field of Search .................... 60/330, 338; 74/572, 74/730.1; 192/3.28; 464/98, 99, 106, 109, 149, 157

[56] References Cited

U.S. PATENT DOCUMENTS

| | | | |
|---|---|---|---|
| 1,107,916 | 8/1914 | Denis | 464/99 X |
| 2,093,955 | 9/1937 | Clark | 464/99 X |
| 2,155,974 | 4/1939 | Lansing | 464/99 |
| 2,551,735 | 5/1951 | Goff | 464/149 |
| 2,625,883 | 1/1953 | Howser | 464/157 X |
| 2,883,839 | 4/1959 | Troeger et al. | 464/157 X |
| 3,252,527 | 5/1966 | Alexander et al. | 464/157 X |
| 3,500,660 | 3/1970 | Anderson | 464/99 |
| 4,441,594 | 4/1984 | Kubo et al. | 192/3.28 |
| 4,502,279 | 3/1985 | Fuehrer | 60/330 |

Primary Examiner—Daniel P. Stodola
Attorney, Agent, or Firm—Donald F. Scherer

[57] ABSTRACT

An axially toothed gear mechanism for transmitting torque and angular displacement from a driving member to a driven member which can accommodate a slight angular mismatch between the two, and which minimizes backlash and wear of the teeth.

3 Claims, 2 Drawing Sheets

AXIAL SPLINE DRIVE LUG

TECHNICAL FIELD

This invention relates to the transmission of torque and rotary motion between a driving member and a driven member. The exemplary embodiment described in this disclosure establishes an axially splined clutch to transmit torque between an engine and an automatic transmission torque converter.

BACKGROUND OF THE INVENTION

A torque converter is connected to an engine crankshaft to transmit driving torque to a transmission. There are several methods presently available for connecting the engine and torque converter. One could bolt the converter to the engine through a flexplate, provide radial splines on both an engine mounted flywheel and the torque converter which would be engaged with one another, or use a dogtooth clutch with mating teeth on the engine mounted flywheel and on the torque converter.

Flexplates, radial splines and dogtooth clutches all have their advantages and disadvantages. Flexplates are able to accommodate a slight amount of angular mismatch between the driving axis and the driven axis. Flexplates are difficult to install. It is necessary to bolt the flexplate to the engine crankshaft or to the flywheel after the transmission housing is attached to the engine flywheel housing, requiring extra effort and time for the installation. It also requires that openings be provided in the flywheel housing for access to the attaching fasteners.

Radial splines make transmission installation easier, since the torque converter splines can be slipped into the engine flywheel splines without the need to torque down any bolts. Radial splines are, however, vulnerable to wear, producing increasing amounts of backlash with time. The need for clearance between the mating splines to allow assembly makes the presence of a slight amount of backlash at assembly unavoidable. Backlash results in accelerated wear of the splines and produces undesired noise. This need to produce splines which have a minimum of backlash, yet will go together easily, requires very tight tolerances on the parts. Any slight angular mismatch between the driving member and the driven member will increase the amount of relative motion between the splines, increasing the rate of wear of the splines, and thereby increasing the amount of backlash.

Dogtooth clutches suffer from the disadvantages of the radial splines, and one additional one: they can be difficult to engage. If the teeth are misaligned, engagement will not be possible.

SUMMARY OF THE INVENTION

The present invention combines the ability of the flexplate to accommodate slight mismatches in angles between the drive axis and the driven axis with the easy assembly characteristics of the radial splines while minimizing the backlash and wear of the parts.

An axial spline system resembles a dogtooth clutch, but its tapered teeth with rounded tips greatly facilitate the engagement of a drive gear with a driven gear. A preload, provided by a flexible drive plate, minimizes wear by reducing slippage between the teeth on the engine side and the torque converter side. The preload also prevents the teeth from disengaging when subjected to high levels of torque.

The drive plate portion of the assembly accommodates slight differences in the angles of the engine and the transmission caused by small variations in the axial location of the drive and driven members and by small amounts of relative axial motion between the drive and driven members. A conventional flexplate, bolted directly to both the torque converter and to the engine crankshaft, will also accommodate these differences.

It is an object of this invention to provide an improved axially meshing torque transmitting mechanism between a driving member and a driven member, having a drive plate with a drive gear attached to it, which meshes with a driven gear attached to a driven plate, one of the drive plate or the driven plate has spring characteristics which allow axial deflection, producing force sufficient to ensure continuous engagement of the axially meshing gears yet low enough to prevent damage to the driving and driven members, with a pilot to axially align the drive and driven plates.

It is another object of this invention to provide an improved axially meshing torque transmitting mechanism between a driving member and a driven member, having a drive plate with a drive gear attached to it, which meshes with a driven gear attached to a driven plate, one of the drive plate or the driven plate has spring characteristics which allow axial deflection, producing force sufficient to ensure continuous engagement of the axially meshing gears yet low enough to prevent damage to the driving and driven member, with a pilot to axially align the drive and driven plates, and having engaging teeth evenly spaced around a constant diameter circumference with angled sides and rounded tips to facilitate meshing.

It is a further object of this invention to provide an improved axially meshing torque transmitting mechanism between an engine and a transmission, having a drive plate with a drive gear attached to it, which meshes with a driven gear attached to a driven plate, one of the drive plate or the driven plate has spring characteristics which allow axial deflection, producing force sufficient to ensure continuous engagement of the axially meshing gears, including a pilot to axially align the drive and driven plates, and having engaging teeth evenly spaced around a constant diameter circumference with angled sides and rounded tips to facilitate meshing.

It is also a further object of this invention to provide an improved axially meshing torque transmitting mechanism between a driving member and a driven member, having a drive plate with a drive gear attached to it, which meshes with a driven gear attached to a driven plate, one of the drive plate or the driven plate has spring characteristics which allow axial deflection, producing force sufficient to ensure continuous engagement of the axially meshing gears, and which also allows the plate to deflect to accommodate a slight angular mismatch between a rotational axis of the drive member and a rotational axis of the driven member, with a pilot to axially align the drive and driven plates.

It is yet a further object of this invention to provide an improved axially meshing torque transmitting mechanism between a driving member and a driven member, having a drive plate with a drive gear attached to it, which meshes with a driven gear attached to a driven plate, one of the drive plate or the driven plate has spring characteristics which allow axial deflection, producing force sufficient to ensure continuous engagement of the axially meshing gears, and which also allows the plate to deflect to accommodate a slight angular mismatch between a rotational axis of the drive member and a rotational axis of the driven member, with a pilot to axially align the drive and driven plates, and having engaging teeth evenly spaced around a constant diameter circumference with angled sides and rounded tips to facilitate meshing.

It is an even further object of this invention to provide an improved axially meshing torque transmitting mechanism between an engine and a transmission, having a drive plate with a drive gear attached to it, which meshes with a driven gear attached to a driven plate, one of the drive plate and the driven plate having spring characteristics which allow axial deflection, producing force sufficient to ensure continuous engagement of the axially meshing gears, and which also allows the plate to deflect to accommodate a slight angular mismatch between a rotational axis of the drive member and a rotational axis of the driven member, with a pilot to axially align the drive and driven plates, and having engaging teeth evenly spaced around a constant diameter circumference with angled sides and rounded tips to facilitate meshing.

These and other objects and advantages will be more apparent from the following description and drawings.

DESCRIPTION OF THE PREFERRED EMBODIMENT

Figure 4:
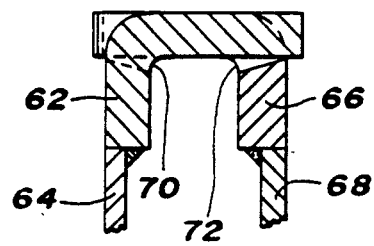
FIG. 4 shows a sectional view of a third alternate construction of the axial teeth.

The accompanying drawings illustrate one representative use of axial gears to transmit torque between a driving member and a driven member.

A drive plate 10 is attached to an engine crankshaft 12 by several bolts 14. An adapter 16 aids in centering the drive plate 10 on the crankshaft 12. A ring gear 18 is attached to an outer diameter flange 20 of the drive plate 10. The ring gear 18 is selectively engaged by a vehicle starter motor gear (not shown) in a well known manner. A constant diameter axial drive gear 22 is attached by welds 26 to a constant diameter vertical adapter 24 which is in turn attached by bolts 28 to the drive plate 10. The drive gear 22 is engaged with a constant diameter axial driven gear 30. The driven gear 30 is attached to a torque converter flywheel 32, which serves as a driven plate, by a weld 31. The torque converter flywheel 32 has a constant diameter boss 33 on the engine crankshaft 12 side circumjacent to an aperture 34 in the adapter 16 which pilots the flywheel 32.

Alternatively, the flywheel 32 may be without the pilot boss 33, relying instead on the engagement of the drive gear 22 with the driven gear 30 to center the flywheel 32 relative to the engine crankshaft 12. The torque converter flywheel 32 constitutes the engine crankshaft 12 side of a torque converter shell 35 which is the exterior part of a torque converter assembly 36. The flywheel 32 is welded to an impeller section 38 of the shell 35. A torque converter turbine 37 is housed within the torque converter assembly 36. The flywheel housing 40 attaches to the engine block 39 so that the flywheel housing interior mounting surface 47 abuts the engine block mounting surface 49. The transmission case 41 is in turn attached to the flywheel housing 40 so that the flywheel housing posterior mounting surface 51 abuts the transmission case mounting surface 53.

Figure 1:
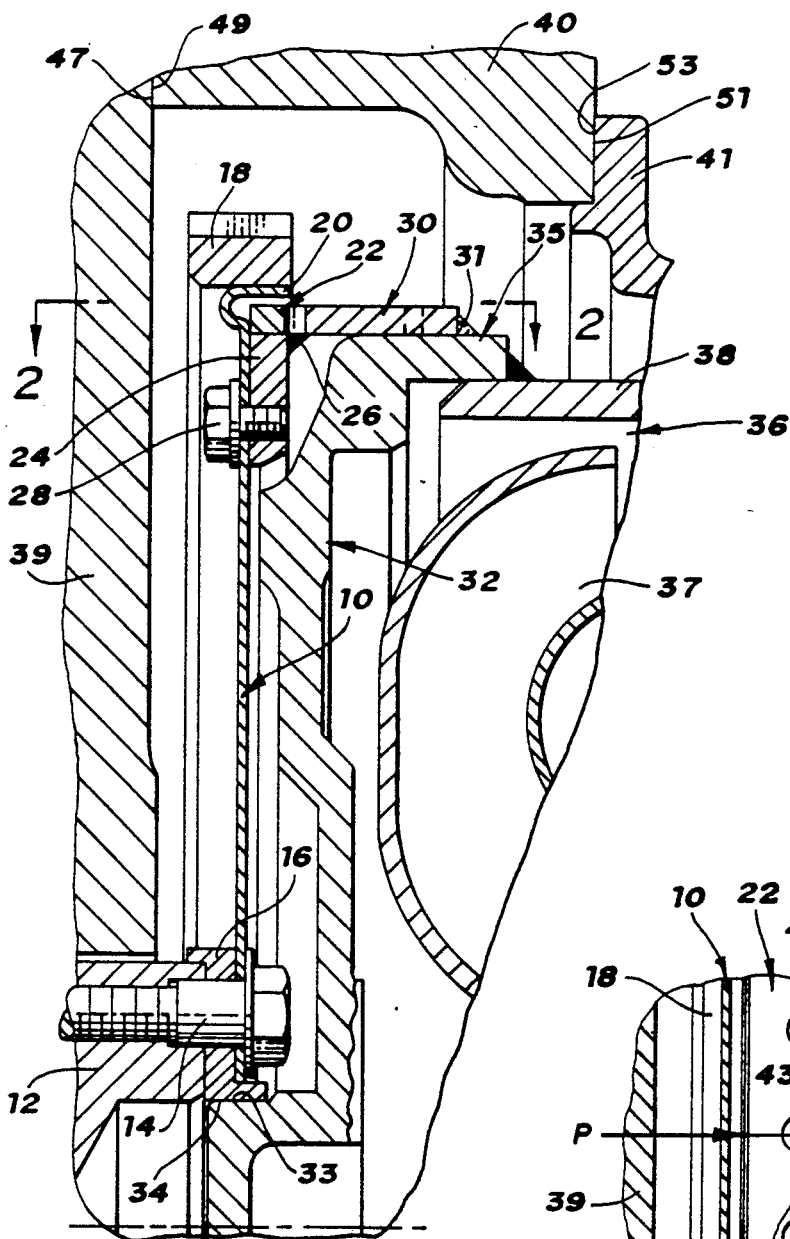
FIG. 1 shows a sectional view of the assembly at the engine crankshaft to torque converter interface.
Figure 2:
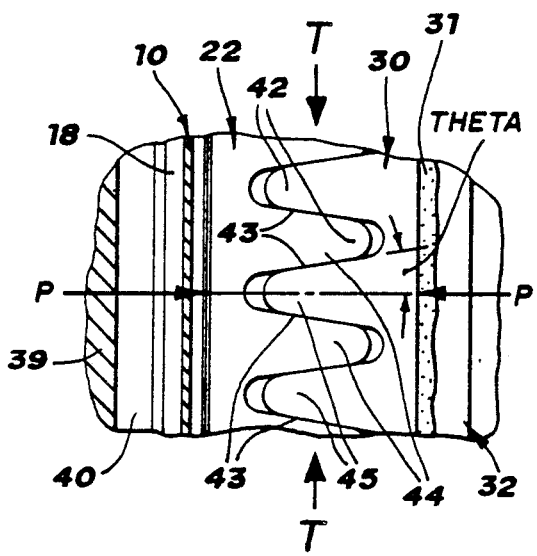
FIG. 2 shows the engagement of the axial teeth in the direction of arrow 2—2 in FIG. 1.

The profiles of both the drive gear teeth 44 and the driven gear teeth 45 can be seen in FIG. 2, which shows the teeth 44 and 45 as viewed in the direction of the arrow 2—2 of FIG. 1. The rounded tips 42 and angled sides 43 of the teeth 44 and 45 facilitate meshing.

Figure 3:
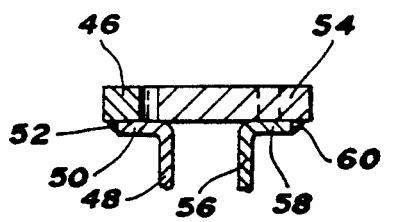
FIG. 3 shows a sectional view of an alternate construction of the axial teeth.

FIG. 3 shows a constant diameter drive gear 46 mounted to a drive plate 48 at a flange 50 by a weld 52, and constant diameter driven gear 54 mounted to a driven plate 56 at a flange 58 by a weld 60, as an alternative construction to FIG. 1. Substituting a flexible driven plate 56 for a flywheel 32 is a method of lowering the axial spring rate of the assembly. This will reduce the overall weight of the system and thereby contribute favorably to vehicle performance and economy. As an alternative to an outright substitution, the flywheel 32 could remain in the system behind the driven plate 56 to provide needed inertia.

A third alternate construction is illustrated in FIG. 4, where a drive gear 62 and a flexible driven gear 66 are welded to drive and driven plates 64 and 68, respectively. The gears 62 and 66 are formed with a 90 degree bend 70 and 72, respectively, to eliminate the need for a flange such as 50 and 58 as seen in FIG. 3.

Figure 5:
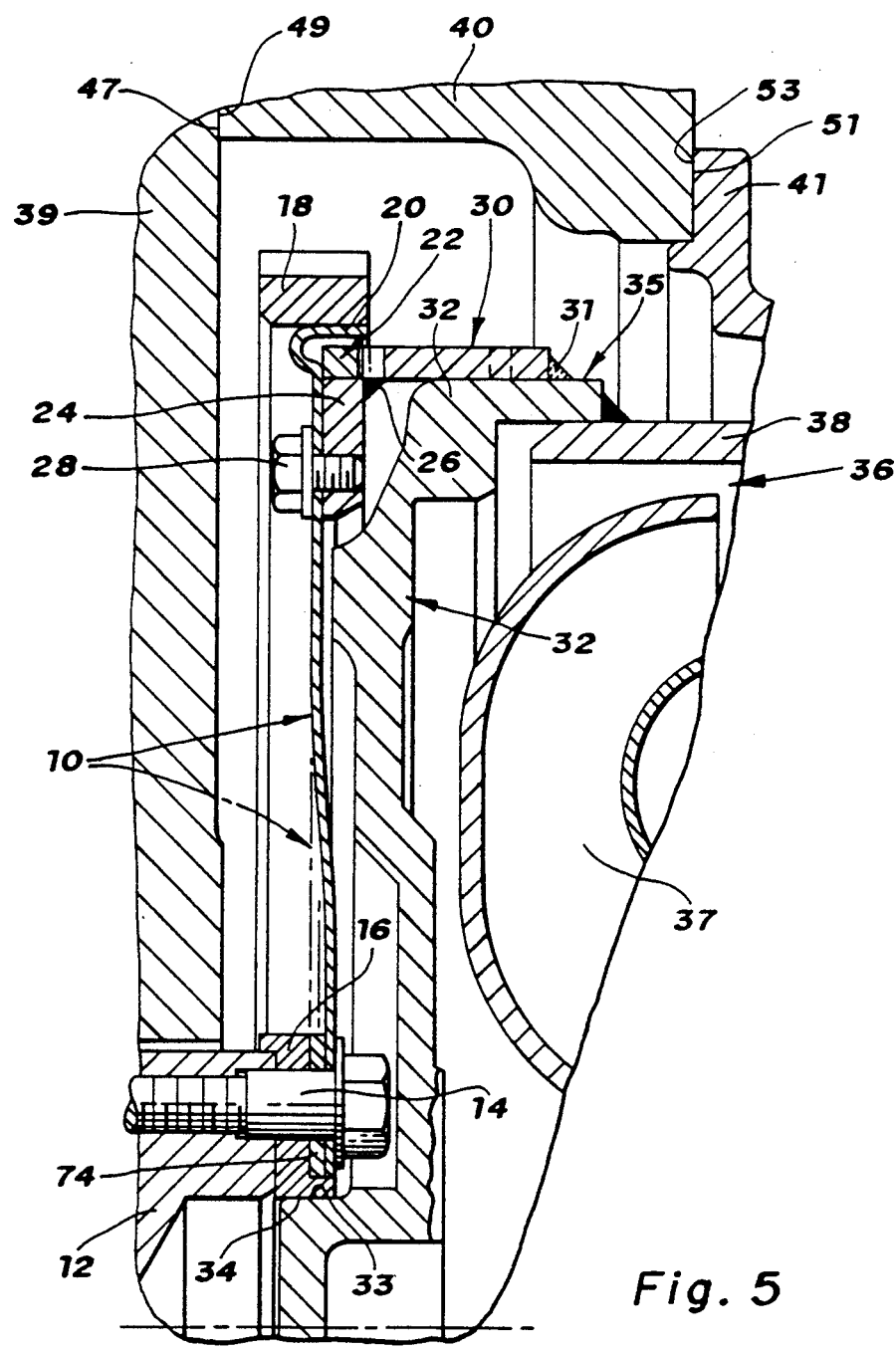
FIG. 5 shows a sectional view similar to that shown in FIG. 1, except that a shim has been placed between the crankshaft and the flexplate to show in exaggerated form how the deflection of the flexplate will contribute to the axial loading of the axial teeth.

FIG. 5 shows a shim 74 placed between the drive plate 10 and the adapter 16. The shim 74 can be used to provide the desired axial preload to the engaging axial teeth 44 and 45. The drive plate 10 is shown as deflecting the full amount of the thickness of the shim 74. The shim 74 is selected on the assumptions that the cumulative axial variations of component dimensions in the engine and transmission assemblies are such that the gears 22 and 30 have a line-to-line fit without the shim 74, that only the drive plate 10 deflects, and that the amount of deflection provided by the shim 74 corresponds to the desired amount of axial preload.

The increased ease of assembly made possible by this invention becomes apparent when closely observing the transmission-to-engine mounting process. As the transmission assembly, comprised of torque converter 36, flywheel 32, and driven gear 30 is moved into contact with the engine assembly, comprised of flywheel housing 40, crankshaft 12, adapter 16, drive plate 10, and drive gear 22, the drive gear teeth 44 contact the driven gear teeth 45. The rounded tips 42 and angled sides 43 of the teeth 44 and 45 force the gears 22 and 30 to index relative to one another allowing engagement. The flywheel boss 33 enters the aperture 34 in the piloting plate adapter 16, centering the flywheel 32 and the driven gear 30 relative to the crankshaft 12 and the drive gear 10. When the flywheel 32 without a pilot boss 33 has been selected, the flywheel 32 is centered relative to the engine crankshaft 12 when the drive gear 22 and the driven gear 30 are fully engaged with one another. The transmission case 41 is then bolted to the flywheel housing 40, which is already bolted to the engine block 39.

In the alternative, the housing 40 can be formed integral with the case 41 and the transmission case 41 bolted directly to the engine block 39. With the mounting of the transmission case 41 to either the engine block 39 or the flywheel housing 40, the drive gear 22 and driven gear 30 are fully meshed.

A compressive load P is maintained on the gears 22 and 30 to ensure their full engagement. Developing a compressive load requires some axial interference between the drive gear 22 and the driven gear 30. This is accomplished by controlling the position of the drive gear 22 relative to the flywheel housing posterior mounting surface 51 (or the engine block mounting surface 49 if the flywheel housing 40 is integral with the transmission case 41), and controlling the position of the driven gear 30 relative to the transmission case mounting surface 53 in the axial direction.

The interference will provide the desired compressive load P on the gears 22 and 30. The interference may also produce an axial loading and displacement of components of the engine and transmission. The magnitude of these effects will depend on the magnitude of the cumulative difference of the component dimensions from their nominal value, or the stack-up, in the axial direction and the axial spring rates of the components in line with the gears 22 and 30. These effects are further magnified by the axial motion of the transmission and engine components operating in a normal manner. Providing an element with a significantly lower axial spring rate than the other elements of the system will allow the system to be much more forgiving of variations in axial stack-up. The drive plate 10 functions as just such an element.

Alternate configurations to achieve the desired spring rate are available. FIG. 3 and FIG. 4 show arrangements where the driven gear is attached to a flexible plate 56 and 68 instead of a rigid flywheel 32. The flexible driven plates 56 and 68 have a much lower spring rate than the flywheel 32. The combination of a low spring rate drive plate 10, 48, and 64 and a low spring rate driven plate 56 and 68 yields a net spring rate which is less than either one alone.

The axial spring rates will vary from design-to-design, depending on the stack-up conditions of the particular design, the angle Theta of the teeth 44 and 45 and the coefficient of friction Mu between the teeth 44 and 45. In some cases, the range of stack-up conditions may be so wide that there is insufficient deflection of the drive plate 10, 48, and 64 or driven plate 32, 56, and 68 to produce the minimum axial load required to maintain gear engagement when the transmission and engine are bolted together. The location of the drive plate 10 can be changed with a shim 74 to ensure the development of the required load as shown in FIG. 5.

The reaction of the angled teeth 44 and 45 to an applied torque will produce a separating force. The axial preload on the gears must equal or exceed the maximum expected separating load. A mathematical relationship for the minimum preload is provided below.

P = Preload Required
T = Torque (Max. Coupling Torque)
R = Radius of the teeth at the center of their engagement.
Mu = Coefficient of friction between the drive and driven teeth.
Theta = Angle between the center axis of the gear and the side of a tooth.

P = (T/R)*[Sin(Theta) - Mu*Cos(Theta)]/[Mu*Sin(Theta) + Cos(Theta)]

P establishes the minimum required preload which, when combined with the resultant frictional force, is sufficient to counteract the separating force. P can be reduced to zero by selecting Theta such that Tan(Theta) = Mu.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. An axially meshing torque transmitting mechanism interconnecting a driving member and a driven member comprising:

drive plate means drivingly connected with said driving member and having a drive gear secured thereto, the drive gear having axially extending teeth;

driven plate means drivingly connected with said driven member and having a driven gear secured thereto, the driven gear having axially extending teeth, and meshing with said drive gear for transmitting torque between said driving and driven members;

said teeth of said drive and driven gears, evenly spaced around a circumference of a diameter on which they are located, said teeth having sides which, when viewed from a direction perpendicular to a longitudinal axis of said corresponding gear, are at an angle to the longitudinal axis, said teeth also having rounded tips to facilitate meshing of said drive gear teeth with said driven gear teeth, said drive gear teeth and said driven gear teeth when fully meshed providing said gears with a common axis of rotation, said teeth providing no lash between said gears when fully meshed, the tooth side angle being such that a separating force is produced between said teeth on said driven gear and said teeth on said drive gear, the separating force increasing in magnitude with a level of torque being transmitted between said driving and said driven members, the separating force pushing said gears away from one another in an axial direction being overcome by an axial spring force preload and a frictional force, the spring force preload being generated by said driving member being moved toward said driven member beyond the point at which said drive gear teeth are fully meshed with said driven gear teeth, resulting in a deflection of one of said drive plate means and driven plate means, and the frictional force being generated by forces normal to said sides of said teeth and a coefficient of friction between said teeth, the spring force preload and the frictional force together being sufficient to overcome the separating force generated by a maximum level of torque to be transmitted between said driving member and driven member;

said one of said drive plate means and said driven plate means having spring characteristics for permitting said one of said plate means to deflect axially when meshing between said gears is initiated thereby generating said axial spring force preload on said drive and driven gears, the spring characteristics ensuring that said axial spring force preload applied at said meshing gears is sufficient to prevent all relative motion between said drive and driven gears when said gears are subjected to said maximum level of torque, the spring characteristics also providing sufficient deflection to accommodate axial movement between said driving member and said driven member which produces said preload, the required magnitude of said axial spring force preload being dependent in part on said coefficient of friction between said drive and driven gear teeth, said angle of said tooth sides, and said diameter on which said teeth are located.

2. An axially meshing torque transmitting mechanism interconnecting a driving member and a driven member comprising:

drive plate means drivingly connected with said driving member and having a drive gear secured thereto, the drive gear having axially extending teeth;

driven plate means drivingly connected with said driven member and having a driven gear secured thereto, the driven gear having axially extending teeth, and meshing with said drive gear for transmitting torque between said driving and driven members;

adapter means centered and rotationally fixed relative to said driving member, centering said drive plate means relative to said driving member axis;

said teeth of said drive and driven gears, evenly spaced around a circumference of a diameter on which they are located, said teeth having sides which, when viewed from a direction perpendicular to a longitudinal axis of said corresponding gear, are at an angle to the longitudinal axis, said teeth also having rounded tips to facilitate meshing of said drive gear teeth with said driven gear teeth, said drive gear teeth sand said driven gear teeth when fully meshed providing said gears with a common axis of rotation, said teeth providing no lash between said gears when fully meshed, the tooth side angle being such that a separating force is produced between said teeth on said driven gear and said teeth on said drive gear, the separating force increasing in magnitude with a level of torque being transmitted between said driving and said driven members, the separating force pushing said gears away from one another in an axial direction being overcome by an axial spring force preload and a frictional force, the spring force preload generated by said driving member being moved toward said driven member beyond the point at which said drive gear teeth are fully meshed with said driven gear teeth, resulting in a deflection of one of said drive plate means and driven plate means, and the frictional force being generated by forces normal to said sides of said teeth and a coefficient of friction between said teeth, the spring force preload and the frictional force together being sufficient to overcome the separating force generated by a maximum level of torque to be transmitted between said driving member and driven member;

said one of said drive plate means and said driven plate means having spring characteristics for permitting said one of said plate means to deflect axially when meshing between said gears is initiated thereby generating said axial spring force preload on said drive and driven gears, the spring characteristics ensuring that said axial spring force preload applied at said meshing gears is sufficient to prevent all relative motion between said drive and driven gears when said gears are subjected to said maximum level of torque and the spring characteristics also providing sufficient deflection to accommodate axial movement between said driving member and said driven member which produces said preload, the spring characteristics also permitting said one of said plate means output shaft axis and said torque converter shell axis, the required magnitude of said spring force preload being dependent in part on said coefficient of friction between said drive and driven gear teeth, said angle of said tooth sides, and said diameter on which said teeth are located.

3. An axially meshing torque transmitting mechanism, for drivingly connecting an engine output shaft with an automatic transmission torque converter shell, meshing upon assembly of an engine block of an engine assembly to a transmission case of an automatic transmission assembly, the block defining both a rotational axis of the output shaft and an axial position thereof and the case defining both a main rotational axis of the torque converter shell and an axial position thereof, the torque transmitting mechanism allowing no relative motion between meshing elements after assembly of the transmission case to the engine block, the torque transmitting mechanism comprising:

drive plate means, drivingly connected with said output shaft, and having a drive gear secured thereto, the drive gear having axially extending teeth;

driven plate means, drivingly connected with said torque converter shell, and having a driven gear secured thereto, the driven gear having axially extending teeth, and meshing with said drive gear for transmitting torque between said output shaft and said torque converter shell;

adapter means centered and rotationally fixed relative to said output shaft, centering said drive plate means relative to said output shaft axis;

said teeth of said drive and driven gears, evenly spaced around a circumference of a diameter on which they are located, said teeth having sides which, when viewed from a direction perpendicular to a longitudinal axis of said corresponding gear, are at an angle to the longitudinal axis, said teeth also having rounded tips to facilitate meshing of said drive gear teeth with said driven gear teeth, the teeth being such that when said drive and driven gears are fully meshed there is no lash between said drive and driven gears and said drive gear and said driven gear have a common axis of rotation, the tooth side angle producing a separating force between said drive gear teeth and said driven gear teeth when torque is transmitted, the separating force tending to push said gears away from one another in an axial direction being overcome by an axial spring force preload and a resultant frictional force between said teeth, the spring force preload generated by assembling said transmission case to said engine block, producing deflection of one of said drive plate means and driven plate means and the frictional force generated by forces normal to said sides of said teeth and a coefficient of friction between said teeth, the preload and the frictional force together being sufficient to overcome the separating force generated by a maximum level of torque to be transmitted between said output shaft and said torque converter shell;

said one of said drive plate means and said driven plate means having spring characteristics for permitting said one of said plate means to deflect axially when said transmission case is mounted to said engine block, said one of said plate means deflecting after said gears are fully meshed as said case is joined together with said engine block, thereby generating said axial spring force preload on said drive and driven gears, the spring characteristics ensuring that said axial spring force preload applied at said meshing gears is sufficient to prevent all relative motion between said gears when said gears are subjected to said maximum level of torque, the spring characteristics also providing sufficient deflection to accommodate axial movement between said output shaft and said torque converter shell as said engine block and said transmission case are joined together, the spring characteristics also permitting said one of said plate means to deflect to accommodate a difference in angles between said output shaft axis and said torque converter shell axis, the required magnitude of said axial spring force preload being dependent in part on said coefficient of friction between said drive and driven gear teeth and said angle of said tooth sides.

* * * * *